United States Patent [19]
Cox et al.

[11] Patent Number: 5,816,340
[45] Date of Patent: Oct. 6, 1998

[54] ROLLING CULTIVATOR SHIELD

[75] Inventors: Philip David Cox, Polk City; James Thomas Noonan, Johnston; David Lee Colgan, Urbandale, all of Iowa

[73] Assignee: Deere & Company, Moline, Ill.

[21] Appl. No.: 828,770

[22] Filed: Apr. 1, 1997

[51] Int. Cl.⁶ .................................................. A01B 17/00
[52] U.S. Cl. .......................................... 172/510; 172/508
[58] Field of Search .................................. 172/508, 509, 172/510, 513, 624.5, 417, 657, 484, 624, 511, 709, 710, 711, 712, 174–176

[56] References Cited

U.S. PATENT DOCUMENTS

| | | | |
|---|---|---|---|
| 4,142,589 | 3/1979 | Schlagenhauf | 172/510 |
| 4,485,878 | 12/1984 | Uken | 172/510 |
| 4,591,002 | 5/1986 | Meinett | 172/510 |
| 5,133,414 | 7/1992 | Youngkrantz | 172/510 |
| 5,222,562 | 6/1993 | Roigen | 172/510 X |
| 5,303,780 | 4/1994 | Evenson | 172/508 X |

OTHER PUBLICATIONS

Deere & Company brochure entitled "Cultivators, Rotary Hoes and Sprayers", A–11–85–10, front cover and p. 37, printed in the U.S., Oct., 1985.

Deere & Company brochure entitled "Cultivators and Hoes", DKA136, front cover and p. 6, printed in the U.S., Oct., 1992.

*Primary Examiner*—Michael J. Carone
*Assistant Examiner*—Robert Pezzuto

[57] ABSTRACT

A large diameter, short toothed rolling shield fabricated by vacuum forming talc filled polyethylene sheet having a smooth surface and sufficient flexibility to resist soil build-up in damp conditions. Preferably the diameter of the shield is substantially greater than twenty inches and on the order of twenty four inches and includes teeth uniformly spaced around the periphery, each tooth having a length less than approximately ten percent of the shield radius. A circular rib near the center of the shield and radial reinforcing ribs extending from the circular rib on the convex side of the shield to the base of alternating teeth provide stiffness and strength. The concave tool side of the shield is devoid of protrusions to reduce churning of thrown soil.

20 Claims, 2 Drawing Sheets

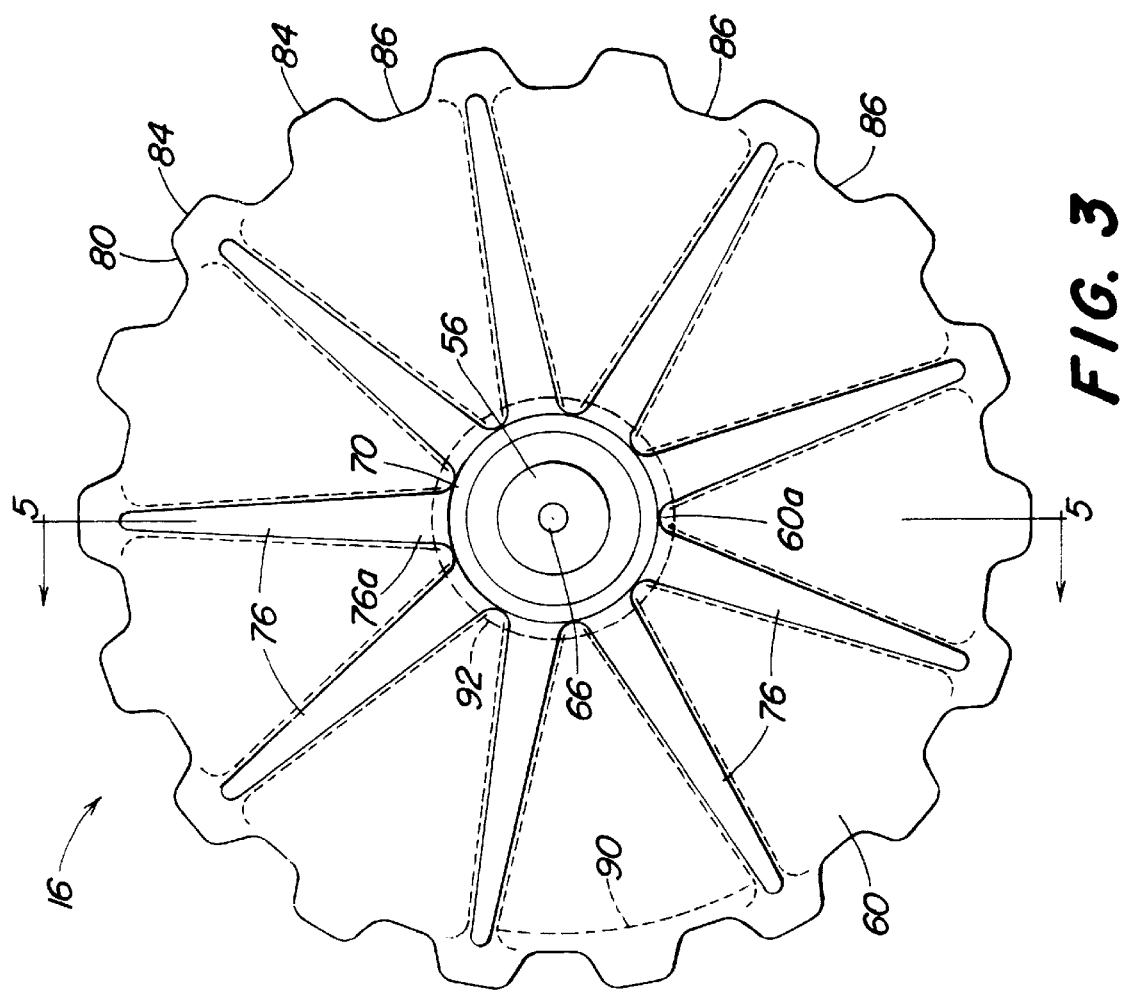

ROLLING CULTIVATOR SHIELD

BACKGROUND OF THE INVENTION

1) Field of the Invention

The present invention relates generally to cultivator shields for a row crop cultivator and, more specifically, to a large diameter, toothed rolling shield.

2) Related Art

As row crop cultivators work the ground between crop rows, ground engaging tools disturb and move soil towards the crop. Shields are often required to protect the crop from the moving soil. Various types of shields are available including steel rolling shields which are supported from the cultivator rig or frame. Usually the rolling shields are approximately twenty inches (51 cm) in diameter and have radially projecting teeth for gripping the ground to keep the shield rolling. The teeth also allow a small amount of soil to pass toward the row. When a pair of the twenty inch shields are supported for rotation on opposite sides of a row, the vertical crop clearance often is insufficient. Crop protection is often inadequate because of a lack of shield surface area near the ground. However, making the shields larger while retaining adequate shield strength results in a substantially heavier and more costly attachment which can be difficult to manufacture. A larger tractor may be required to handle the added weight of the larger metal shields. Wear, corrosion and lack of smooth trash and soil shedding surfaces are also problems with many of the previously available shields.

BRIEF SUMMARY OF THE INVENTION

It is therefore an object of the present invention to provide an improved rolling shield for a cultivator or similar implement. It is a further object to provide such an improved shield which overcomes most or all of the aforementioned problems.

It is a further object of the present invention to provide an improved rolling shield which is light weight and relatively inexpensive to manufacture. It is a further object to provide such a shield which is strong enough to withstand the hostile operating conditions and environment of a row crop cultivator.

It is still another object of the present invention to provide an improved rolling shield which is larger and yet lighter than most previously available rolling shields. It is a further object to provide such a shield having good wear and corrosion resistance and increased crop clearance and enlarged shielding area.

It is still another object to provide a cultivator rolling shield with an improved tooth arrangement that allows the shield to grip the ground and roll while providing better shielding of the crop than most previously available rolling shields.

A rolling crop shield constructed in accordance with the teachings of the present invention includes a large diameter, short toothed single piece body fabricated by vacuum forming talc filled polyethylene sheet of thickness of approximately one-eighth to three-sixteenth of an inch. Preferably the diameter of the shield is substantially greater than twenty inches and on the order of twenty four inches and includes eighteen teeth uniformly spaced around the periphery, each tooth having a length less than approximately ten percent of the shield radius with a generally flat tooth end. Nine radial reinforcing ribs extend from a central location to the base of alternating teeth, and a circular rib is located around the hub area to provide stiffness and strength. The ribs narrow towards the periphery of the shield to provide maximum crop clearance near the ground for protection of small crops. The shields also have a smooth surface and sufficient flexibility to easily shed soil.

The shield presents a concave surface to thrown soil. The radial ribs project from the opposite convex side to produce a thicker cross section for a given amount of material and provide a smooth, protrusion free soil-side geometry to reduce the amount of soil churning as thrown soil hits the concave surface. In moist soil conditions, the rib construction and smooth surface minimize sticking of the soil to the shield.

The relatively large shield diameter provides added vertical crop clearance by raising the axis of rotation of the disks and decreases the shield drawbar angle for a given drawbar length. Additional shield area close to the ground results in better crop protection. The short teeth grip the ground and keep the shield turning but limit the amount of soil that moves toward the crop. The plastic shields are light weight and reduce the tractor size required to lift the row crop cultivator. Lighter shield weight also reduces forces on the bracket and drawbar during normal operation and while the cultivator is in transport with the shields in the raised position. The plastic material wears well and resists corrosion from agricultural chemicals such as pesticides.

These and other objects, features and advantages of the present invention will become apparent to one skilled in the art upon reading the following detailed description in view of the drawings.

BRIEF DESCRIPTION OF THE DRAWINGS

FIG. 3 is an enlarged side view of the rolling shield.

FIG. 4 is an end view of the shield of FIG. 3.

FIG. 5 is a section of the shield taken essentially through lines 5—5 of FIG. 3.

DETAILED DESCRIPTION OF THE DRAWINGS

Figure 1:
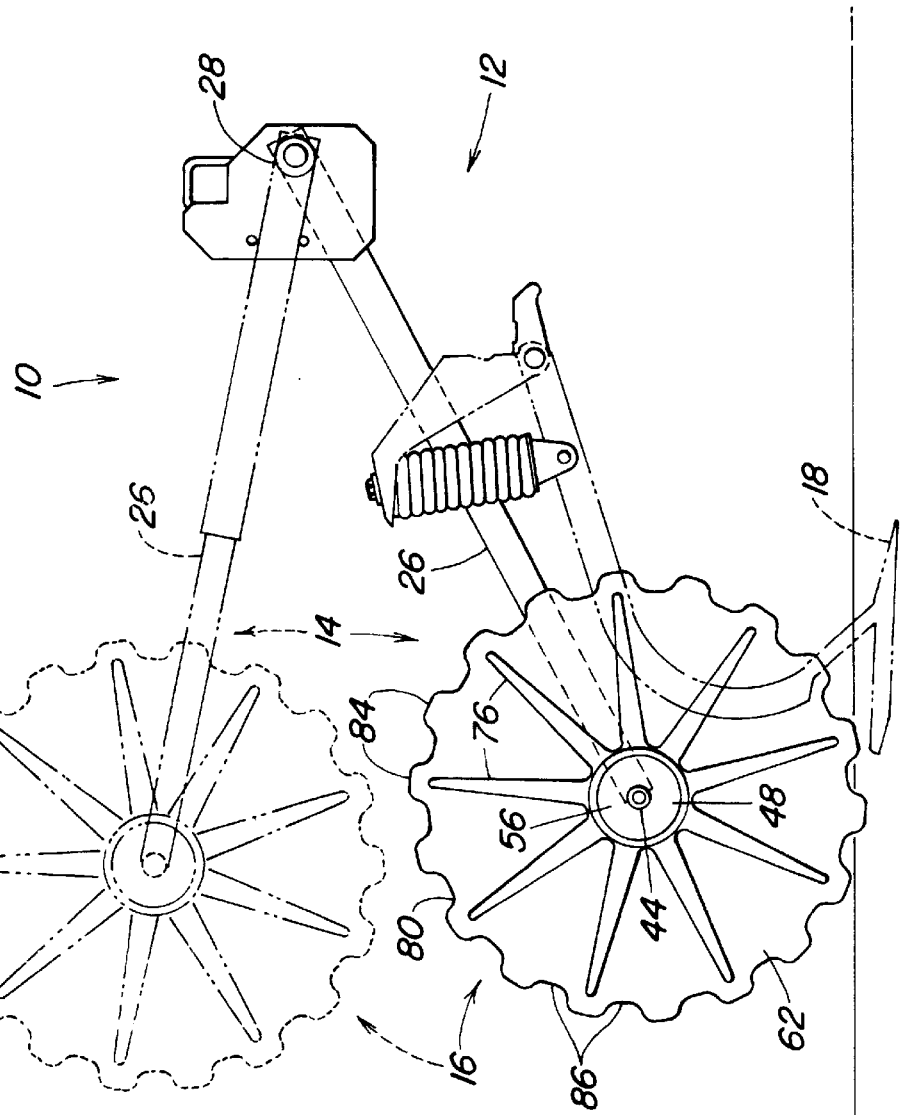
FIG. 1 is a side view a portion of a row crop cultivator with rolling shields.

Referring now to FIG. 1, therein is shown a portion of a row crop cultivator 10 including a shank assembly portion of a cultivator rig 12 and a rolling shield assembly 14 pivotally connected to the main frame (not shown) or to the rig 12 of the cultivator 10 and including plastic rolling shields 16. The cultivator rig 12 includes sweeps 18 which work the soil between the rows of crop and throw soil and plant debris outwardly towards the rows as the cultivator 10 moves forwardly over a field. The shields 16 protect the crop from the moving soil and debris.

An adjustable length drawbar tube 26 includes an upper forward end 28 connected for pivoting relative to the cultivator rig 12 and a lower trailing end including a pivot boss 32 welded to the tube end and supporting a pair of the shields 16 on opposite sides of the drawbar tube 26 for rotation on opposite sides (FIG. 2) of a row of crop 36. A bushing assembly 40 including a chrome plated bushing rotating inside nylon bushings is pressed into each end of the pivot boss 32. The nylon bushings are stationary along with the pivot boss and drawbar tube 26. The chrome bushing turns along with the shields 16. Also turning with the shields 16 is a cap screw and nut assembly 44 which clamps large diameter washers 48 against a central hub portion 56 of each shield. The rolling shield assembly 14, with the exception of the shields 16, is generally of conventional construction and is generally of the type available with John Deere model 856 Row Crop Cultivator.

Each shield 16 has an outer or convex side 60 (FIG. 2) in the direction of a row of crop 36 that is to be protected from thrown dirt and debris. An opposite inner or concave side 62 opens towards the tools 18 to intercept the dirt and debris. The shield 16 is designed to reduce churning of soil by the concave side 62 and provide maximum crop protection and crop clearance.

Referring to FIGS. 3–5, the shield 16 is disk shaped having a center location 66. The central hub portion 56 is flat and apertured at the center of the disk to receive the cap screw and the large diameter washer 48 of FIG. 1. A channel-shaped reinforcing rib 70 struck on a radius centered on the axis of rotation at the location 66 and opening in the direction of the convex side 60 (towards the row 36) encircles the flat hub portion 56. Channel-shaped reinforcing members or ribs 76 project radially from the circular reinforcing rib 70 towards the periphery of the shield. The ribs 76 project outwardly from the convex side (FIG. 4) to thereby increase cross sectional dimension of the disk and also present a smoother surface to the thrown soil on the concave side 62. The open side of the channel-shaped ribs 76 on the soil-side of the shield 16 provides less aggressive soil churning than would a projecting rib on the soil side of the shield. The ribs 76 present a star-shaped pattern and decrease in size towards a toothed peripheral portion 80 of the disk.

Figure 2:
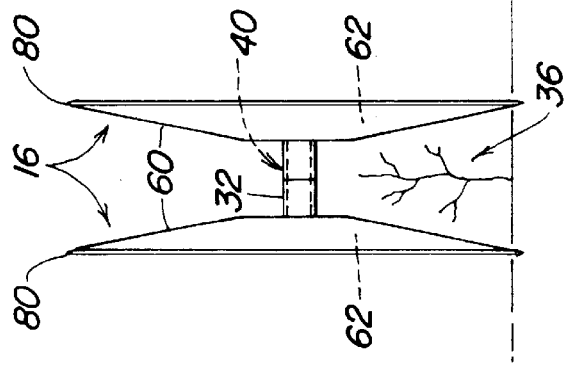
FIG. 2 is a rear view of a pair of rolling shields straddling a row of crop.

Shallow flat teeth 84 are uniformly spaced around the peripheral portion 80 and define radially inward gullets 86 between the teeth. As shown, eighteen teeth 84 are uniformly spaced around the peripheral portion 80, and the gullets 86 have a shape complimentary to the teeth 84. Preferably the teeth 84 project radially from the gullets 86 a distance less than about ten percent of the radius of the disk. As shown, the number of ribs 76 is equal to half the number of teeth 84, and the ends of the ribs 76 terminate at central locations at the base of the teeth (FIG. 3). As the ribs 76 approach the peripheral portion 80, both the depth (FIG. 4 and 5) and the width (FIG. 3) of the ribs 76 decrease and taper into the main surface on the convex side 60 to increase crop clearance near the bottom of the shield 16 (FIG. 2). On the convex side 60, bases 76a of the ribs 76 at the circular rib 70 connect to the outermost portion of the U-shaped cross-section (above the rib 70 as viewed in FIG. 5). The narrow portion 60a of the convex side 60 adjacent the rib 70 is connected to, and forms an S-shaped cross section with, the rib (FIG. 5).

By way of example only with reference to FIGS. 3–5 which are drawn essentially to scale, the flattened end portions of the teeth 84 line on a circle of radius substantially greater than ten inches and preferably on the order of twelve inches. The bottom of the gullets 86 lie on a circle struck on a radius of approximately eleven inches so that tooth projection is only about one inch. The radius of the circular rib 70 is approximately one and seven-eighths inches. The concavity of the disk is such that the distance D (FIG. 5) from the peripheral portion to a plane passing through the bottom of the rib 70 is approximately one and one-third inches.

The shield 16 preferably is fabricated by a vacuuming forming process from a talc filled polyethylene sheet of thickness on the order of one-eight to three-sixteenth of inch. The sheet is symmetrical about first and second perpendicular lines intersecting the center of the sheet to reduce warping of the disk member during fabrication and assure that the peripheral portion 80 lies substantially along an upright plane. If additional stiffness and warp-resistance is desired, another channel-shaped circular reinforcing rib concentric with the rib 70 may be added near the peripheral portion 80 (see location 90 of FIG. 3) adjacent the outermost ends of the ribs 76. The plastic sheet has a smooth surface and sufficient flexibility to prevent soil build-up during operation of the shields 16 in damp soil. To provide increased stiffness and strength around the central hub portion 56 while retaining outer flexibility to resist build-up, a large diameter hub washer may be added which extends from the location 66 out to the bases of the ribs 76 (see 92 of FIGS. 3 and 5). The weight of the shields 16 is substantially less than for steel shields of similar diameter resulting in lower overall cultivator weight. The lower shield weight also reduces wear and tear on the drawbar and attaching brackets, particularly when the shields are raised for transport (broken lines of FIG. 1).

Having described the preferred embodiment, it will become apparent that various modifications can be made without departing from the scope of the invention as defined in the accompanying claims.

We claim:

1. A rolling shield for a row crop cultivator for protecting a crop from soil thrown by an earthworking tool, the shield comprising a disk member having a circular configuration with a central hub portion defining a generally horizontal axis of rotation, and a peripheral portion, the disk member having a radius greater than ten inches and fabricated from plastic, and a plurality of reinforcing members formed in the plastic and extending radially from the hub portion toward the peripheral portion to increase cross section and stiffness of the disk adjacent the hub portion, and wherein the disk has a convex outer side and a concave inner side, the reinforcing members projecting outwardly from one of the sides of the disk away from the soil thrown by the earthworking tool to thereby reduce churning of the thrown soil by the reinforcing members.

2. The shield as set forth in claim 1 wherein the disk member includes radially extending teeth spaced around the peripheral portion and wherein the reinforcing members are channel-shaped and decrease in size in the radially outward direction to thereby provide improved crop clearance at a location adjacent a bottom area of the disk member, and wherein the reinforcing members project to alternate teeth so that a substantial portion of the sides of the disk is void of the reinforcing members, thereby providing minimal interruption of the sides to reduce churning of thrown soil.

3. The shield as set forth in claim 1 wherein the disk member includes a plurality of radially extending teeth spaced around the peripheral portion and the teeth extend radially from the peripheral portion a distance less than ten percent of the radius of the disk member.

4. The shield as set forth in claim 2 wherein the channel shaped reinforcing members extend to the base of the alternate teeth and include endmost portions that are substantially narrower than the teeth.

5. The shield as set forth in claim 1 wherein the peripheral portion includes a plurality of teeth with radially inwardmost base portions, and the channel shaped reinforcing members terminate at the base portions.

6. The shield as set forth in claim 1 wherein the disk member further includes a circular reinforcing portion adjacent the central hub portion and having a radius centered on the axis of rotation.

7. The shield as set forth in claim 6 wherein the reinforcing members radiate from the circular reinforcing portion and further including a second circular reinforcing portion adjacent the peripheral portion and radially outermost portions of the reinforcing members.

8. The shield as set forth in claim 7 wherein the reinforcing members have widths which decrease in the radially outward direction and have radially innermost portions terminating at the reinforcing portion.

9. The shield as set forth in claim 6 including a washer located adjacent the central hub portion and projecting radially over the circular reinforcing portion to thereby increase the strength and stiffness of an area of the disk member adjacent the hub portion.

10. The shield as set forth in claim 1 wherein the disk member is fabricated from a plastic sheet using a vacuum forming process.

11. The shield as set forth in claim 10 wherein the plastic sheet is symmetrical about first and second perpendicular lines intersecting the center of the sheet to reduce warpage of the disk member during fabrication.

12. The shield as set forth in claim 11 wherein the plastic sheet has a smooth surface and a thickness on the order of one-quarter to three-sixteenth of an inch, and wherein the shield is concave substantially the entire radius of the disk.

13. The shield as set forth in claim 1 wherein the disk has a convex an inner side, the inner side being concave substantially the entire radius of the disk from the hub portion through the periphery, and the reinforcing members project outwardly from the convex outer side of the disk.

14. A rolling shield for a row crop cultivator for protecting crop from thrown soil, the shield comprising a disk member fabricated from plastic, the disk member having a circular configuration with a central hub portion defining an axis of rotation, and a peripheral portion, the disk member having a radius greater than ten inches and a plurality of teeth formed in the peripheral portion and defining gullet areas between the teeth, the teeth projecting radially from gullet areas a distance less than ten percent of the radius of the disk to limit amount of the thrown soil passing from one side of the disk to the other, and wherein the disk member is substantially uniformly concave from the central hub portion to the teeth.

15. The shield as set forth in claim 14 wherein the teeth are spaced equidistantly around the peripheral portion and wherein the disk member includes reinforcing ribs formed in the plastic projecting radially from the central hub portion to the teeth.

16. The shield as set forth in claim 14 wherein the teeth have flat, elongated outermost end portions of preselected length and the gullet areas are substantially flat and have a length approximately equal to the preselected length.

17. A rolling shield for a row crop cultivator for protecting crop from thrown soil, the shield comprising a disk member fabricated from plastic, the disk member having a circular configuration with a central hub portion defining a horizontally disposed axis of rotation, and a peripheral portion, the disk member having a radius greater than ten inches and a plurality of teeth formed in the peripheral portion and defining gullet areas between the teeth, the disk member having a convex side and an opposite concave side, the concave side adapted for intercepting the thrown soil, and reinforcing ribs extending radially from the hub portion and projecting from the convex side to thereby increase cross sectional dimension of the disk member and present a surface generally uninterrupted by the protecting ribs to the thrown soil on the concave side.

18. The shield as set forth in claim 17 wherein the disk member further includes a channel-shaped circular rib encircling the hub portion, and wherein the reinforcing ribs are also channel-shaped.

19. The shield as set forth in claim 17 wherein the reinforcing ribs decrease in size in the radially outward direction terminating radially inwardly from the teeth.

20. The invention as set forth in claim 17 wherein the disk member is substantially uniformly concave from the central hub portion to the teeth and is vacuum formed from polyethylene sheet having a thickness no more than approximately three-sixteenth inch.

\* \* \* \* \*